Nov. 5, 1963 A. H. FAULKNER ETAL 3,109,979
TRANSISTORIZED REGULATED POWER SUPPLY
Filed July 14, 1958
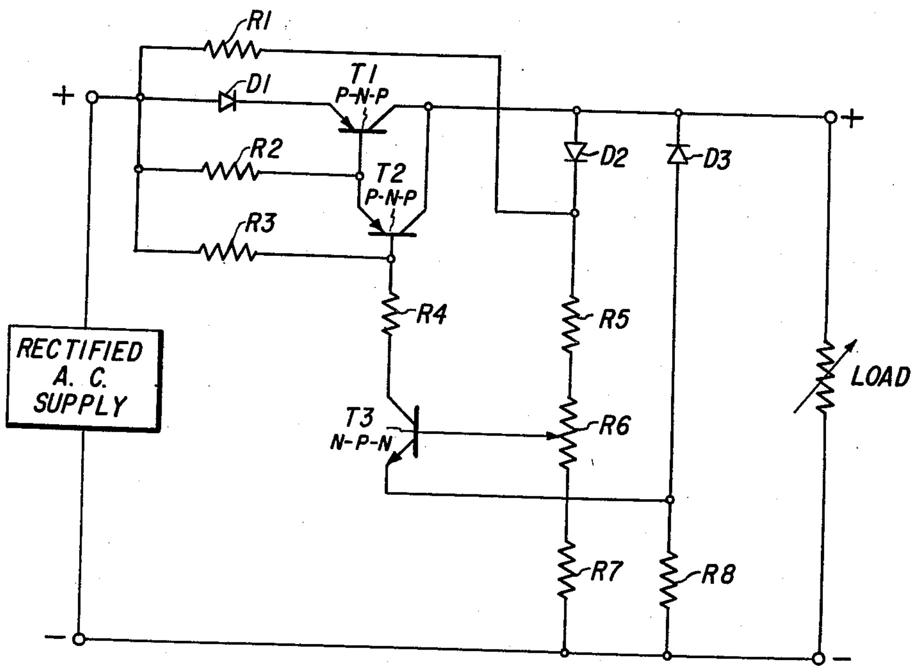
INVENTOR.
ALFRED H. FAULKNER
THOMAS H. JEFFERY
BY C. A. Gulbrandsen
ATTY.

3,109,979
Patented Nov. 5, 1963

3,109,979

TRANSISTORIZED REGULATED POWER SUPPLY

Alfred H. Faulkner, Redondo Beach, Calif., and Thomas H. Jeffery, Oak Park, Ill., assignors to Automatic Electric Laboratories, Inc., a corporation of Delaware Filed July 14, 1958, Ser. No. 748,223
2 Claims. (Cl. 323—22)

This invention relates to power supply apparatus and more particularly to a transistorized power supply for controlling the supply of current from a current source to a load to minimize changes of load voltage.

An object of this invention shall be to provide an improved circuit for regulating the supply of potential from a source to a load in a transistorized supply.

Another object of this invention shall be the reduction of the effect of collector current leakage in the regulating transistors in a power supply.

Another object of this invention shall be the protection of the transistors in a power supply, from damage caused by excessive collector current.

A still further object shall be to provide novel means for starting conduction in transistors.

Other objects and a fuller understanding of the invention may be had by referring to the following description and claims taken in conjunction with the accompanying drawing which is a schematic circuit view of a power supply embodying the invention.

With reference to the drawing there is provided a source of rectified current, the positive terminal of said source being connected to the positive terminal of a load that may vary, as to the amount of current drawn. This connection is made through the emitter-collector path of P-N-P transistor T1 and through silicon diode D1, the positive terminal of the current source is connected to the anode of diode D1, the cathode of diode D1 is connected to the emitter of transistor T1, the collector of transistor T1 is connected to the positive terminal of the load. The negative terminal of the current source is connected directly to the negative terminal of the load. Two current paths forming a voltage detection network are connected across the load. One of these is a voltage reference network consisting of silicon diode D3 and a resistance R8. The diode D3 is poled so that current flows through it in the inverse or high resistance direction. The resistor R8 has a resistance such that the current flowing through the diode D3 exceeds the so-called "Zener" point. Under this condition the voltage across the diode remains substantially constant irrespective of changes of current flowing through it. The second current path consists of a voltage dividing network comprised of germanium diode D2, resistance R5, potentiometer R6, and resistance R7. The base of transistor T1 is connected to the emitter of the second P-N-P transistor T2. The collector of transistor T2 is connected to the positive terminal of the load. The collector leads of the transistors T1 and T2 are common to the same terminal. The base of transistor T2 is connected to the collector of an N-P-N transistor T3. This connection is made through resistance R4. Resistance R4 is effective to limit excessive collector current in driving transistor T3. The emitter of transistor T3 is connected to the voltage reference network connected across the load, comprised of diode D3 and resistance R8. The base of transistor T3 is connected to the potentiometer R6 of the voltage dividing network connected across the load. Biasing potential for transistors T1 and T2 consists of rectified potential from the current source connected to the emitter of transistor T1 through diode D1 and from the base of transistor T1 through resistance R2, and similarly for transistor T2 from the current source through diode D1 to the emitter of transistor T1, from the base of transistor T1 to the emitter of transistor T2, with the base of transistor T2 connected to resistance R3. The inclusion of diode D1 utilizes the forward voltage drop of a silicon rectifier. Since the forward voltage-to-amperage characteristic of a rectifier is non-linear, an appreciable voltage will be developed across diode D1 when minimum collector current in transistor T1 is flowing, thus biasing the base of transistor T1 toward collector current cutoff, compensating against the effects of collector current leakage at high junction temperatures. If a resistor is used in place of diode D1 and collector current is at a minimum, sufficiently large bias would not be available unless the selected resistance value was quite large. Obviously then a suitable resistance would dissipate a very large amount of power causing extremely low regulator efficiency. The collector of transistor T1 is connected to the positive terminal of a load and the emitter of transistor T1 to the unregulated source. The biasing arrangement mentioned above develops a base to emitter bias of the polarity necessary to tend to cutoff transistor T1. The voltage developed across diode D1 tends to bias the base positive with respect to the emitter.

A bypass circuit for rendering transistor T1 conductive is provided by connecting the positive terminal of the current source to a point on the voltage dividing network between diode D2 and resistance R5. This connection is made through resistance R1. Current flows from the positive terminal of the current supply source into the emitter and out of the collector of transistor T1 and to the positive terminal of the load and from the negative terminal of the load, to the negative terminal of the supply source. Current also flows from the positive terminal of the load through the voltage dividing network comprised of diode D2, resistance R5, potentiometer R6, and resistance R7 to the negative load terminal, and through the voltage reference network consisting of diode D3 and resistance R8, also to the negative load to terminal. A portion of the current also flows from the negative terminal of the load through resistance R8, to the emitter of transistor T3, then flowing from the collector of transistor T3 into the base of transistor T2 from the emitter of transistor T2 into the base of transistor T1. The base potential of transistor T3 is preferably somewhat positive with respect to its emitter potential so that current also flows from the positive load to terminal through diode D2, resistance R5, and potentiometer R6 into the base of and out of the emitter of transistor T3 and through resistor R8 to the negative load terminal.

An increase of load voltage, will make the base of transistor T3 less positive with respect to the potential of the emitter, because of the increased voltage drop across the voltage dividing network and the substantially constant voltage drop across diode D3. Therefore, the current flowing into the base of transistor T3 will decrease to cause the curent flowing out of the base of transistor T2 and current flowing out of the base of T1 and then ultimately into the collector of transistor T3, to decrease. As a result, the current flowing into the emitter and out of the collector of transistor T1 and similarly transistor T2 and through to the load will decrease, to minimize the initially assumed rise of load voltage. An increase of ambient temperature, will make both the base and the emitter of transistor T3 more negative with respect to the positive load terminal, potentiometer R6 is adjustable to minimize or substantially eliminate a change of load voltage as a result of ambient temperature change. The amount of current available to the voltage detection network is inadequate to render transistor T1 conductive. To overcome this difficulty a bypass circuit from the current source to the junction of diode D2 and resistor R5 is established. Diode D2 in the voltage dividing network prevents the current in this bypass circuit from being conducted to the positive terminal of the load. This bypass circuit provides adequate current to the base of transistor T1 to render it conductive. When transistor T1 becomes conductive current then flows from the positive terminal of the rectified source through diode D1, transistor T1, and thence to the positive terminal of the load. Then the bypass circuit, because of the resistance R1 therein becomes substantially non-operative. It will be understood that other types of transistors could be employed in place of transistors T1–T3 providing that the circuits in which they are connected are modified, where necessary to suit their characteristics. While the presently described embodiment of this invention employs a P-N-P transistor in seires with the load and a P-N-P first control transistor and an N-P-N second control transistor, transistors of opposite conductivity types may be substituted upon reversal of appropriate voltages and polarities and polarized circuit elements.

Transistor types which have been employed in practical embodiment of the present system are as follows:

| Reference figure: | Type |
|---|---|
| T1 | 2N68 |
| T2 | 2N101 |
| T3 | 2N35 or 2N94 |

Diode types which have been employed in a practical embodiment of the present system are as follows:

| Reference figure: | Type |
|---|---|
| D1 | TM–2 |
| D2 | T12G |
| D3 | 653C3 |

Values of resistances contained in a practical embodiment of the present system are as follows:

| Reference figure: | Value (ohms) |
|---|---|
| R1 | 1000–4700 |
| R2 | 330–820 |
| R3 | 1200–6800 |
| R4 | 470 |
| R5 | 270 |
| R6 | 100 |
| R7 | 120 |
| R8 | 1000 |

It is to be understood that the above described arrangements are illustrative of the application of the principles of the invention. Numerous other arrangements may be devised by those skilled in the art without departing from the spirit and the scope of the invention.

What is claimed is:

1. In a transistorized regulating power supply, a power source, a regulating transistor having base, emitter and collector electrodes, a variable load connected to said collector electrode, and biasing means for said transistor providing bias potential maintained at a substantially constant value regardless of load variations, including asymmetrically conducting means connected to said emitter and said power source, and further including resistance means connected between said base and said power source, whereby said resistance means may be of a relatively high value in comparison to resistance means included in biasing means comprising only resistance means.

2. In a transistorized regulating power supply, a regulating transistor having base, emitter and collector electrodes, a load connected to said collector electrode, a power source connected to said emitter electrode, voltage dividing means including a rectifying device connected across said load, circuit connections, connecting said regulating transistor to said dividing means, starting means comprising said rectifying device and a bypass connection, bypassing said emitter and collector electrodes, said bypass connection and rectifying device acting to direct current from said power source to the base of said regulating transistor, to initiate conduction therein, when said power supply is placed in operation under heavy load conditions.

References Cited in the file of this patent

UNITED STATES PATENTS

| | | |
|---|---|---|
| 2,693,568 | Chase | Nov. 2, 1954 |
| 2,852,730 | Magnuski | Sept. 16, 1958 |
| 2,889,512 | Ford et al. | June 2, 1959 |
| 2,903,640 | Bixby | Sept. 8, 1959 |
| 2,967,991 | Deuitch | Jan. 10, 1961 |

FOREIGN PATENTS

| | | |
|---|---|---|
| 763,316 | Great Britain | Dec. 12, 1956 |